No. 857,463. PATENTED JUNE 18, 1907.
G. W. IRWIN.
VALVE FOR EXPLOSIVE ENGINES.
APPLICATION FILED SEPT. 12, 1904.
2 SHEETS—SHEET 1.
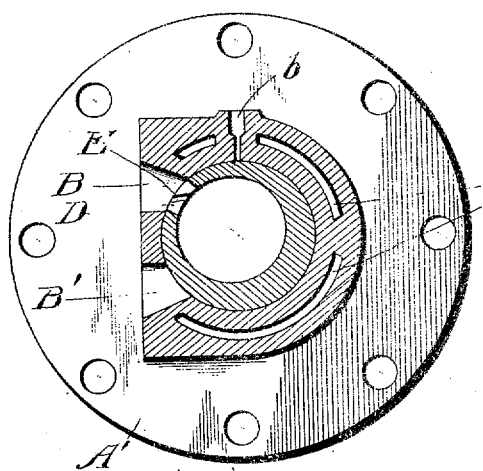
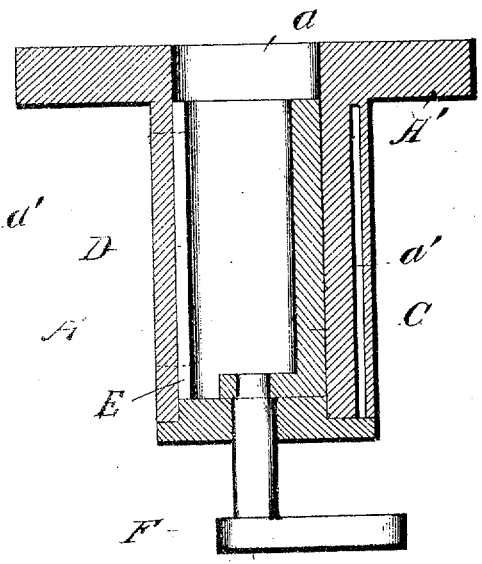
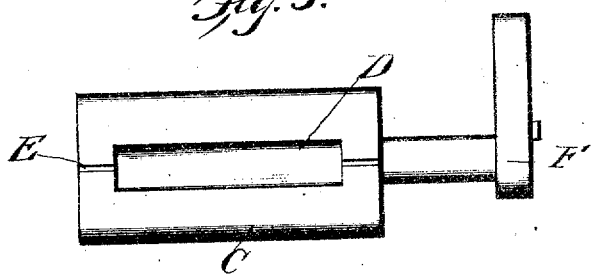
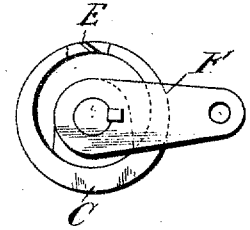
Witnesses
J. F. Pattison
Alice W. Ehrsling
Inventor
G. W. Irwin
By A. S. Pattison, Attorney

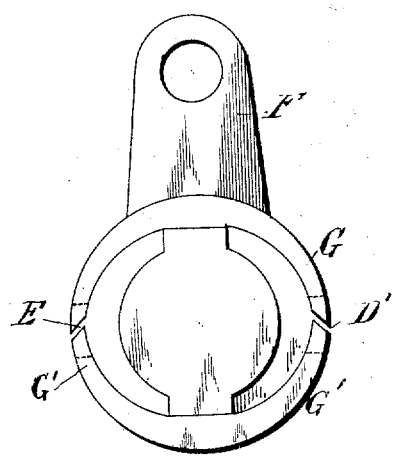
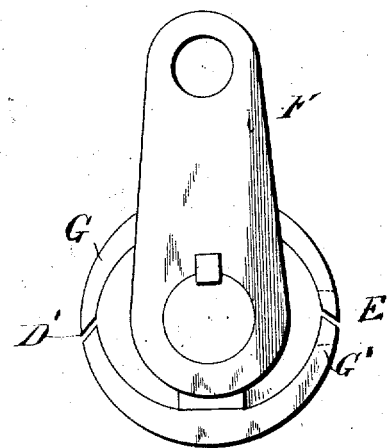
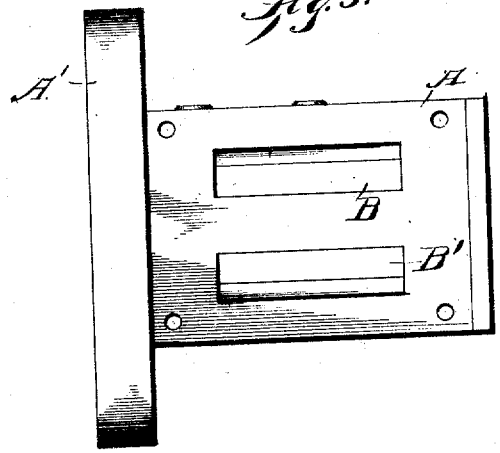
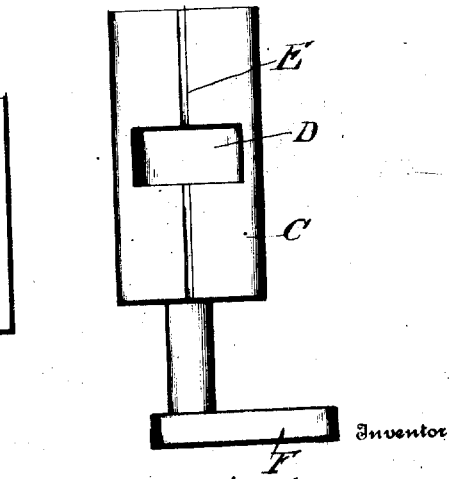

UNITED STATES PATENT OFFICE.

GUY W. IRWIN, OF BRADFORD, PENNSYLVANIA.

VALVE FOR EXPLOSIVE-ENGINES.

No. 857,463.        Specification of Letters Patent.        Patented June 18, 1907.

Application filed September 12, 1904. Serial No. 224,160.

*To all whom it may concern:*

Be it known that I, GUY W. IRWIN, a citizen of the United States, residing at Bradford, in the county of McKean and State of Pennsylvania, have invented certain new and useful Improvements in Valves, of which the following is a specification, reference being had therein to the accompanying drawing.

My invention relates to improvements in valves for explosive engines, and pertains particularly to that class used in connection with internal combustion engines or motors.

The object of my invention is to provide a valve which will not become distorted out of working form, when subjected to the intense heat coincident with the working of engines or motors of this character, and at the same time providing a valve which will not destroy the working surface of itself or the chamber in which it is carried when expanded by the heat to which it is necessarily subjected.

Another object of my invention is to provide a valve of this character, which is provided with a single opening which is used as an inlet and exhaust opening, thus exposing as little of the lubricated surface of the chamber to the fire as possible, except that which covers the one port, and that only during the explosion of the engine.

In the accompanying drawings, Figure 1, is a longitudinal vertical sectional view of the valve chamber showing the valve mounted therein. Fig. 2, is a transverse vertical sectional view of the same showing the water jacket surrounding the valve. Fig. 3, is an enlarged plan view of the valve showing the same completely severed from end to end. Fig. 4, is an end view of my improved valve showing the connection of the valve operating arm therewith. Fig. 5, is a side view of the valve casing showing the inlet and exhaust ports. Fig. 6, is an end view of a modification showing the valve completely severed in two places. Fig. 7, is an end view of Fig. 6, looking in the opposite direction. Fig. 8, is a plan view of a modification showing the inlet opening extending transversely instead of longitudinally.

Referring now to the drawings, A represents a valve chamber or casing which as shown, is of a cylindrical form, and provided with the open end $a$ which is provided with an outwardly-extending flange A' by means of which the same may be bolted to the engine cylinder, and is in communication therewith through the open end. The said chamber casing A is preferably provided with a water space $a'$ therein, thus allowing of a circulation of water therethrough for the purpose of cooling the chamber, and also preventing the valve from becoming too hot, and thus preventing the premature ignition of the charge, which might otherwise occur. The said chamber A is provided with an inlet opening B through which the charge is sucked during the suction action of the piston, and is provided with an exhaust opening B' through which the gases exhaust during the exhaust movement of the piston. The said chamber A as before described, is of a cylindrical form, and provided with the central cylindrical opening in which is mounted a hollow cylindrical valve C, which is provided with an eccentric opening or bore therethrough, and the end of said valve adjacent the opening in the casing is open, thus the central eccentric opening or bore in the valve is in direct communication with the engine cylinder. The casing A is provided with an opening $b$ through which a lubricant is fed, to the working part of the valve, the said opening being so positioned that the combined exhaust and inlet opening of the valve does not at any time register therewith, thus the oil or oiled surface is not exposed to the fire of the cylinder.

The said valve intermediate its ends and in the thin wall formed by the eccentric opening or bore, is provided with an elongated opening D which is of a size to correspond with that of the inlet, and exhaust openings B and B' of the chamber, thus the working surface of the casing will not be exposed to the fire from the cylinder, when the said opening is either exhausting or taking a charge. The said valve oscillates (or it may be so constructed that it may reciprocate) and is connected to the working part of the engine, and so timed that the opening in the valve will register with either the inlet or exhaust opening at their proper time. The only part of the working surface of the chamber that is exposed to the fire of the cylinder, is that part which closes the opening in the valve during the explosion of the engine, and I preferably show that part between the inlet and exhaust openings.

The said valve as before described, is provided with the openings D which serve the two fold purpose of an inlet and an exhaust opening, and is of an elongated form, and extending from the ends of said opening to the ends of the cylindrical valve is a slit or cut E which, as clearly shown, is cut at an angle with the radius. The valve being cut in this manner, and the sides of the cut being out of contact, allows of the expansion of the valve caused by the intense heat, and thus the valve and the working portion of the chamber will not become injured. Should expansion of the valve be such that would cause the sides of the cut to meet, the elasticity of the metal allows one side to be forced from the wall of the chamber, and thus causes the valve to leak and call attention to the same. This cut being cut at an angle to the radius, causes the portion to leave the side of the wall of the chamber, which would not be the case if they are cut parallel therewith, as they would jam the valve within the chamber.

The end of the valve opposite the open end is provided with a valve operating arm F which is connected to the engine in any desired manner, and adapted to oscillate the valve at the time specified heretofore.

In the modification shown in Figs. 6, 7 and 8, the valve is made the same shape as heretofore described, only instead of having an eccentric opening or bore in the same, it is provided with an oval bore which forms two oppositely arranged thin elastic walls G and G', and one of said walls is provided with the opening D, the same as heretofore described, and the cut extends therefrom to the ends and is cut at an angle to the radius. The opposite thin elastic wall G is provided with a cut D' extending the entire length of the valve, and is also cut at an angle to the radius. This forms a valve practically in two parts, and said parts are connected at one end by the valve operating arm which is connected to the thick walls thereof, thus leaving the elastic thin walls free to expand and providing twice as much expanding space before the valve will leave the wall of the chamber, and which would not occur under the ordinary usage of gas engines.

Having thus described my invention, what I claim and desire to secure by Letters Patent, is:—

1. The combination with a gas and oil engine cylinder, of a round valve in communication therewith, and having an oval opening therein, thus forming two thin walls, and cuts extending through the entire length of said thin walls.

2. The combination with a gas or oil engine cylinder, of a valve chamber in communication with the cylinder, and a hollow valve within said chamber and having cuts on opposite sides at an angle to the radius thereof, and extending entirely through the walls of the valve.

3. The combination with a gas or oil engine cylinder, of a valve chamber in communication therewith, a valve within said valve chamber and having cuts on opposite sides at an angle to the radius thereof, and completely severing the valve into two sections, and a transverse member connecting the said sections at one end intermediate the cuts.

4. The combination with a gas or oil engine cylinder, of a valve in communication therewith and having an oval opening therein forming two oppositely arranged thin walls, and said thin walls having cuts completely severing the valve and said cuts extending at an angle to the radius thereof.

5. The combination with a gas or oil engine cylinder, of a round valve in communication therewith and having an oval opening forming two thin walls, said thin walls having cuts completely severing the valve into two sections, and said cuts extending at an angle to the radius thereof and a transverse member within one end of the valve and secured to the thick walls of the two sections of the valve and holding them in their relative positions.

6. The combination with a gas or oil engine cylinder, of a round valve in communication therewith and having an oval opening therethrough forming two thin walls, said thin walls having passage-ways and cuts extending from said passage ways to the end of the valve and completely severing the valve into two sections, said cuts extending at an angle to the radius thereof, and a transverse member within one end of the valve and secured to the thick walls of the two sections of the valve, and holding them in their relative positions.

7. The combination with a gas or oil engine cylinder, of a round valve in communication therewith and having an oval opening therethrough forming two thin walls, said thin walls having passage-ways and cuts extending from said passage-way to the end of the valve at an angle to the radius thereof and completely severing the valves into two sections, and a transverse member within one end of the valve and secured to the thick walls of the two sections of the valve, and holding them in their relative positions, and a valve stem extending laterally from the said transverse member.

8. The combination with a gas or oil engine cylinder, of a cylindrical valve chamber in communication therewith at one end, a round valve filling said chamber and having an oval opening therethrough forming two thin walls, said thin walls having oppositely-arranged passage-ways, and cuts extending from the opposite sides of each passage-way to the end of the valve at an angle to the radius of the valve, and completely severing the valve into two elongated semi-circular sections, a transverse plate within one end of the valve and flush therewith and secured to the thick walls of the semi-circular sections and holding them in their relative positions, a valve-stem secured to said plate and extending through the valve chamber, and operating means carried by the end of said stem.

9. The combination with a gas or oil engine cylinder, of a valve chamber in communication therewith, a valve within the chamber and having expansibly controlled means constructed and arranged to cause the hot gases to leak from around the valve to indicate that the valve is overheated.

10. The combination with a gas or oil engine, cylinder, of a valve chamber in communication therewith, a hollow valve within the chamber and having expansibly controlled means constructed and arranged to cause the hot gases to leak from around the valve to indicate that the same is overheated.

11. The combination with a gas or oil engine cylinder, of a hollow valve having a wall with relatively thick and thin portions, the thin portion having expansibly-controlled means constructed and arranged to cause the hot gases to leak from around the valve to indicate that the valve is overheated.

12. The combination with a gas or oil engine, cylinder, of a hollow valve having a wall with relatively thick and thin portions, the thin portion having a cut at an angle to the radius to cause the hot gases to leak from around the valve to indicate that the valve is overheated.

In testimony whereof I affix my signature in presence of two witnesses.

GUY W. IRWIN.

Witnesses:
HERMAN H. NORTH,
ABNER T. IRWIN.